United States Patent [19]

Kobayashi

[11] 4,059,393

[45] Nov. 22, 1977

[54] APPARATUS FOR CALCINING POWDER MATERIALS

[75] Inventor: Toshihiro Kobayashi, Tokyo, Japan

[73] Assignee: Ishikawajima-Harima Jukogyo Kabushiki Kaisha, Ote, Japan

[21] Appl. No.: 689,725

[22] Filed: May 25, 1976

[30] Foreign Application Priority Data

June 20, 1975 Japan ............................... 50-74075

[51] Int. Cl.² ............................................. F27B 15/00
[52] U.S. Cl. ...................................... 432/58; 432/14; 432/106
[58] Field of Search ...................... 432/13, 14, 58, 106

[56] References Cited

U.S. PATENT DOCUMENTS

| | | | |
|---|---|---|---|
| 2,100,907 | 11/1937 | McGehee et al. | 432/58 |
| 3,140,862 | 7/1964 | Schoppe | 432/58 |
| 3,869,248 | 3/1975 | Hirai et al. | 432/106 |

*Primary Examiner*—John J. Camby
*Attorney, Agent, or Firm*—Scrivener, Parker, Scrivener & Clarke

[57] ABSTRACT

The combustion air, which is induced into a calcining furnace (calciner) from the lower end thereof and is vigorously swirled upward along the furnace wall, is burned by a plurality of burners and the negative pressure region may be developed at the center portion of the furnace. The exhaust gases leaving a rotary kiln, in which the calcined raw materials are burned to clinker, are led upwardly from the center of the furnace bottom into the said negative region and mixed with combustion gases. The raw material particles may be fed directly into the said negative region or to kiln exhaust gases so as to be entrained into the said region.

2 Claims, 6 Drawing Figures

APPARATUS FOR CALCINING POWDER MATERIALS

DETAILED DESCRIPTION OF THE INVENTION

The present invention relates to an apparatus for calcining fine raw materials to produce cement, alumina or the like.

The conventional vertical type cylindrical and conical calciners may be generally classified into two types as shown in FIGS. 1 and 2, respectively, depending upon the gas combustion methods.

In the calciner of the type shown in FIG. 1, the combustion air $a$, which is preheated by the heat-exchange with clinkers in a clinker cooler, is brought into a combustion chamber A with swirling movement for burning fuel supplied through burners $c$, and then in a mixing chamber B, the combustion gases from the combustion chamber A are mixed with the exhaust gases $b$ (to be referred to as "kiln exhaust" in this specification) from a rotary kiln or the like, in which the calcined raw materials are further heat-treated to be the final product.

In the calciner of the type shown in FIG. 2, the heated combustion air $a$ and the kiln exhaust $b$ are previously mixed in a mixing chamber B, and a mixture of the heated combustion air and the kiln exhaust from the mixing chamber is brought into a combustion chamber A with swirling movement for burning fuel supplied through burners $c$.

In the calciner of the type shown in FIG. 1, the fuel is burned in the preheated air so that a highly efficient combustion may be obtained. However, a large quantity of nitrogen oxides (to be referred to as NOx in this specification), produced as a result of the high temperature combustion in the kiln and contained in the kiln exhaust, does not pass through the fuel firing zone (the combustion chamber A) and therefore, is not reduced or decomposed in it so that the gases with a high NOx concentration are discharged from the process to the surrounding atmosphere.

In the calciner of the type shown in FIG. 2, the NOx in the kiln exhaust is reduced in the firing zone (combustion chamber A) by means of the activated carbon monoxide (CO) transiently produced in the course of combustion acting as a reducing agent and calcined raw materials as a catalyzer so that NOx in the kiln exhaust may be reduced to a level between 30 and 70% depending upon the operating conditions. However, the fuel is burned in the mixture gases in which the oxygen concentration is much lower than air so that the combustion is inefficient as compared with the system shown in FIG. 1. Therefore the excess air ratio of the calciner shown in FIG. 2 must be raised to some extent higher than that of the calciner shown in FIG. 1 and as a result, the thermal efficiency may be lowered.

The fine raw materials may be brought into the calciner, either through a port $d$ arranged on the wall of the calcining furnace, or being suspended in the gases to be induced into the calciner (not shown). In either case, the raw material particles are forced to move toward the periphery of the calciner by the swirling gas flows so that the center portion of the calcining furnace cannot be used effectively.

In some cases, a portion of the raw material particles fed in the calciner reaches to and accumulates on the bottom of the calciner without being suspended in the gas. If the accumulated raw materials are left for a long time, they are heated by the gases and are agglomerated thereby plugging the gas passage. Therefore, such deposit of raw materials must be continuous or intermittently discharged to the kiln through a pipe $e$. In general, these materials are not sufficiently calcined so that they may bring reduction in and heterogeneity of a calcination degree to the overall raw materials to be sent to the kiln.

Volatile matters such as alkali, chlorine and so on, which exist in the gaseous phase in the kiln exhaust, are cooled by and condensed upon the wall in the vicinity of the gas entrance of the furnace to form a coating which plugs up the gas passage. In the calciner of the type shown in FIG. 2, the kiln exhaust $b$ is mixed with the combustion air $a$ with a lower temperature so that a substantial portion of volatile matters in the kiln exhaust $b$ are condensed on the surface of the duct which is carried over from the kiln together with the gases. Therefore, the calciner has less troubles than the calciner shown in FIG. 1, but it is still impossible to completely eliminate the formation of the coating due to the volatile matters.

In view of the above, one of the objects of the present invention is to overcome the coating formation and the deposit of raw materials encountered in the conventional calciners.

Another object of the present invention is to provide a calciner which has not only a high combustion efficiency but also an excellent efficiency for reducing or decomposing the nitrogen oxides produced in the kiln.

A further object of the present invention is to provide a calciner which may function as a very efficient heat-exchange as a whole.

The present invention will become apparent from the following description of preferred embodiments thereof taken in conjunction with the accompanying drawing, in which.

Figure 3:
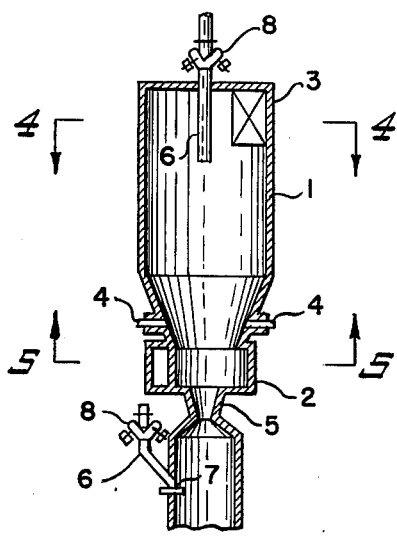
FIG. 3 is a schematic sectional view of a first preferred embodiment of the present invention.
Figure 4:
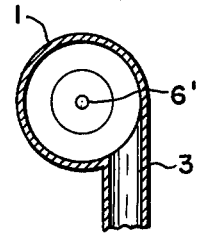
FIG. 4 is a sectional view taken along the line IV—IV of FIG. 3.
Figure 5:
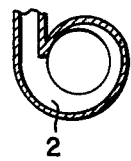
FIG. 5 is a sectional view taken along the line V—V of FIG. 3.

As shown in FIG. 3, the calciner in accordance with the present invention consists of a vertical furnace body 1 composed of a cylindrical section with a closed top with or without an inverted truncated conical diffuser, and a volute chamber 2 (see FIG. 5) attached to the lower end of the furnace body 1 for inducing the combustion air into the furnace body 1 with swirling movement. A kiln exhaust duct 5 is connected to the bottom of the volute chamber 2 so that the kiln exhaust may flow through it into the furnace body 1. A plurality of burners 4 are attached to the furnace body 1 in the vicinity of the lower end thereof or the chamber 2 (FIG. 5) in such a way that the axes of them may be directed toward the furnace center or may be slightly tangential. A tangential exhaust opening 3, as shown in FIG. 4, or a volute exhaust opening 3, similar in cross section to the volute chamber 2, is located at the upper end of the furnace body 1, and is connected through a duct to a cyclone (not shown). The combustion air flows up along the furnace wall with the strong swirling movement from the volute chamber 2 and is burned by the burners 4 so that a negative pressure region may be developed at the center portion of the furnace body 1. The kiln exhaust, which flows upwardly through the volute chamber 2, is diffused with the combustion gases in this negative pressure region.

When the flow rate of the kiln exhaust is sufficient to suspend and entrain all of the raw materials to be treated, they are fed through a chute 6 and a dispersion plate 7 into the kiln exhaust duct 5. However when the flow rate of the kiln exhaust is not sufficient, a portion or the whole of the raw materials may be fed directly into the negative pressure region of the furnace body 1 through a chute 6', FIG. 6, which passes through the ceiling thereof and is extended downward. The chutes 6 and 6' are connected with the material discharge of a preheater (not shown) by way of flap gates 8 which are used in order to ensure not only the air-tightness but also the uniform distribution of the raw material particles throughout the cross section of the chutes 6 and 6'.

Figure 1:
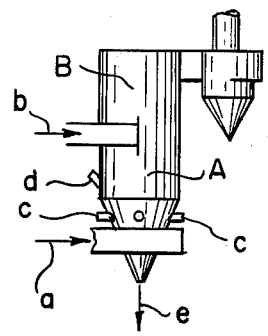
FIGS. 1 and 2 are schematic views of the conventional calciners.
Figure 2:
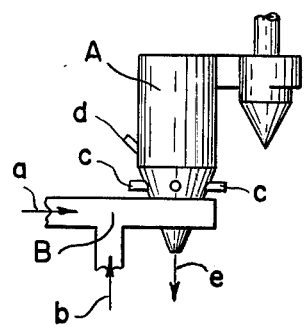
Figure 6:
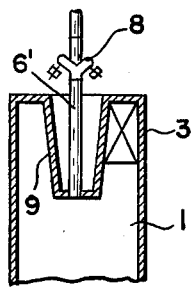
FIG. 6 is a fragmentary sectional view of a second preferred embodiment of the present invention.

The second embodiment shown in FIG. 6 is substantially similar in construction to the first embodiment shown in FIG. 1 except that an inner tube 9, in the form of a cylinder or an inverted truncated cone with the length longer than the height of the exhaust opening 3, is extended downward from the ceiling of the furnace body 1 and, that the chute 6' is so extended as to open at the bottom of the inner tube 9. Next the mode of operation of the first embodiment will be described. The combustion air which is heated from 650° C to 750° C in a clinker cooler (not shown) is induced into the volute chamber 2. Thus in the furnace body 1 the uniform and strong swirling flow of gases from the volute chamber 2 toward the discharge opening 3 is formed along its wall, while the negative pressure region is developed at its center. Atomized fuel by the burners 4 is thoroughly mixed with and burned in this swirling combustion air. On the other hand, the kiln exhaust flows up through the kiln exhaust duct 5 and passes through the volute chamber 2 with such a velocity that it penetrates without being mixed with combustion air. Then the kiln exhaust is induced into said negative pressure region of the furnace body 1 where it is violently mixed with and diffused into the swirling flow of combustion gases. The arrangement of the second embodiment (see FIG. 6) is very effective to prevent disturbances of the swirling flow by the exhaust opening 3.

The raw material particles are fed through the chute 6 into the kiln exhaust duct 5 and the preliminary calcination is effected while they are suspended in the kiln exhaust of 1000° to 1200° C and this mixture of gases and particles flows through the kiln exhaust duct 5. As a result of heat exchange, the mixture temperature will become about 850° C at the time when the mixture reaches to the negative pressure region.

The raw material particles fed through the chute 6' are also lifted up by the kiln exhaust in the vicinity of the lower end of the furnace body 1, uniformly diffused throughout the cross-section of it and subjected to the preliminary calcination.

In either case, raw material particles are then moved due to the centrifugal force developed by the swirling gas flow, to the periphery of the furnace body 1, which is the fuel firing zone. In this zone fuel combustion and heat transfer of the developed heat to the raw material particles take place instantaneously and simultaneously so that major calcination is effected. Thus all of the raw material particles are calcined almost completely until they are discharged together with the gases through the exhaust opening 3 toward the cyclone. In the cyclone, the calcined raw material particles are separated from the gases to be sent into a kiln (not shown), while the gases flow into the preheater so as to preheat the raw materials to be fed into the calciner.

In both the first and second embodiments, the chutes 6' are shown as being extended downwardly, but it is to be understood that the chutes 6' may be arranged and located in any suitable manner as long as the raw material particles may be charged into the negative pressure region so as to be suspended in and mixed with the kiln exhaust.

The effects, features and advantages of the present invention may be summarized as follows:

i. Since the combustion takes place along the furnace wall where oxygen concentration is as high as air, the calciner in accordance with the present invention has the combustion efficiency as high as the calciner of the type in which the combustion and the mixing chambers are arranged independently of each other. Since the kiln exhaust is diffused from the furnace center toward the fuel firing zone, the concentration of nitrogen oxides thereof (about 1000PPM) may be reduced to a level of 30 and 70% which is just the same as to be obtained by the calciner of the type in which a mixture of the combustion air and the kiln exhaust is burned.

ii. After the preliminary calcination by the kiln exhaust, the raw material particles are uniformly diffused into the fuel firing zone at the lower end portion of the furnace body, where the major calcination is effected. In other words, the preliminary and major calcinations are carried out in two steps by the kiln exhaust and the combustion gases produced by fuel burning, respectively, so that all material particles are uniformly calcined and a high degree of calcination can be attained. Thus heat released in the rotary kiln can be reduced further so that the kiln size may be made smaller than that required by the conventional calciner.

iii. Since the center portion of the furnace body may be effectively utilized to carry out the preliminary calcination, the quantity of heat releases per unit effective volume of the furnace may be increased. As a result, the calciner in accordance with the present invention may be made compact in size as compared with the conventional calciners in which the concentration of the raw materials is low at the center portion of the furnace body.

iv. Opposed to the conventional calciners, the strong downward flow does not exist at the center of the lower end portion of the furnace body and the volute chamber so that the raw material particles do not fall to be accumulated on the bottom of the furnace.

v. The kiln exhaust is quenched by the heat-exchange with the raw materials, and as a result, the volute matters such as alkali, chlorine and so on contained in it are condensed on the surfaces of the particles. Furthermore, the inner walls of the volute chamber as well as the lower end portion of the furnace are covered by the combustion air so that the direct contact with the kiln exhaust thereto is avoided. Therefore, the formation of coatings can be prevented.

I claim:

1. An apparatus for calcining powder materials consisting of:

a. a furnace body having a closed top portion and a tangential gas exhaust opening located at the top portion, said furnace body being in the form of a cylinder;

b. a volute chamber attached to the lower end portion of said furnace body for inducing combustion air into said furnace body so that an upwardly swirling gas flow is created along the furnace wall, while a negative pressure region is created along the furnace wall, while a negative pressure region is developed at the center of said furnace;

c. a kiln exhaust duct connected to the center of the bottom of said volute chamber so that the kiln exhaust may be induced upwardly toward the center portion of said furance body;

d. a plurality of burners attached to the lower end portion of said furnace body, and e. a material feeding device comprising a material chute connected to said kiln exhaust duct so that the raw material particles are supplied to said negative pressure region of the furnace body after being suspended in said kiln exhaust.

2. An apparatus as set forth in claim 1 wherein said material feeding device consists of a material chute having its discharge opening so directed that the material particles may be supplied into the negative pressure region developed in said furnace body.

* * * * *